United States Patent [19]

Tabayashi et al.

[11] 4,409,040
[45] Oct. 11, 1983

[54] INK FOR USE IN INK-JET PRINTER

[75] Inventors: Isao Tabayashi, Tokyo; Hiromi Soma, Warabi; Hiroshi Fukutomi, Urawa, all of Japan

[73] Assignee: Dainippon Ink and Chemicals Inc., Tokyo, Japan

[21] Appl. No.: 348,159

[22] Filed: Feb. 12, 1982

[30] Foreign Application Priority Data

Feb. 18, 1981 [JP] Japan .................. 56-21432

[51] Int. Cl.³ .............................................. C09D 11/02
[52] U.S. Cl. ......................................... 106/20; 106/22
[58] Field of Search ........................ 106/20, 22, 24–31

[56] References Cited

U.S. PATENT DOCUMENTS

| | | | |
|---|---|---|---|
| 2,544,732 | 3/1951 | Shechmeister | 428/289 |
| 4,155,767 | 5/1979 | Specht et al. | 106/22 |
| 4,165,399 | 8/1979 | Germonprez | 427/264 |
| 4,210,566 | 7/1980 | Murray | 106/22 |

Primary Examiner—Lorenzo B. Hayes
Assistant Examiner—Amelia B. Yarbrough
Attorney, Agent, or Firm—Sherman & Shalloway

[57] ABSTRACT

Ink for use in an ink-jet printer, said ink comprising a solution in water of a water-soluble dye, a wetting agent and a compound of the following formula

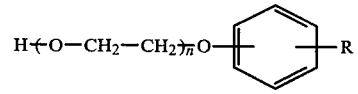

wherein R represents $-C_mH_{2m+1}$ or $-O-C_mH_{2m+1}$, m represents 0 or an integer of 1 to 6, and n represents an integer of 1 to 10.

13 Claims, No Drawings

INK FOR USE IN INK-JET PRINTER

This invention relates to an improved ink for use in an ink-jet printer.

An ink-jet recording method is now practiced which comprises jetting ink from nozzles having an orifice diameter of as small as 10 to 400 microns at high speed to print various characters such as letters, figures, etc. on a record medium. This method has the advantage of producing records of high resolution with low noises and of permitting color printing as well.

Despite this advantage, the ink-jet printing method has very low reliability because the orifice diameter of the nozzles used is very small and nozzle blockage is prone to occur. The tendency toward nozzle blockage is especially great when water in the ink is volatilized, and it is frequently difficult to prevent it even when a wetting agent such as a polyhydric alcohol is added to the ink for prevention of water volatilization. Generally, with an "on-demand type" ink jet method, this tendency is relatively greatly reduced. But according to a "charge control-type" or "field control-type" ink-jet printing method, the clearance between the end surfaces of the nozzles and a charging electrode is very narrow, and it is quite difficult to achieve any modification in the printer itself for prevention of ink volatilization.

One attempt to remove nozzle blockage is to add a solubilizing agent to ink, and so far, there have been proposed various solubilizing agents, for example alkyl ether derivatives such as ethylene glycol, polyethylene glycol and polypropylene glycol, pyrrolidone derivatives, alkanolamines, and nonionic, cationic and anionic surface-active agents. The solubilizing abilities of these compounds, however, have not proved to be entirely satisfactory.

On the other hand, the drying property of printed characters is determined by the rate of ink penetration into the paper, and tends to be nearly proportional to the surface tension of the ink. When the surface tension of the ink is too low, the drying time is very short but blurring of the printed characters increases. When the surface tension is too high, blurring of the printed characters is reduced, but the driving time required is considerably long.

Surface tensions of the ink which are conducive to excellent drying property and reduced blurring range from 40 to 55 dynes/cm. In order to adjust the surface tension of ink to this range, it is the general practice to add 0.1 to 1% of a non-ionic, anionic or cationic surfactant to the ink. The addition of the surfactant, however, tends to adversely affect the jetting stability of the ink because the stability of the ink with time is reduced, the pigment is precipitated tending to block up the nozzles, and the foamability of the ink increases.

It is an object of this invention therefore to provide ink for an ink-jet printer, which can be jetted stably over an extended period of time without changes of the ink with time and nozzle blockage and can give printed characters that dry within a short period of time and have reduced blurring.

According to this invention, there is provided an ink for use in an ink-jet printer, said ink comprising a solution in water of a water-soluble dye, a wetting agent and polyethylene glycol phenyl ether and/or its derivative represented by the following formula

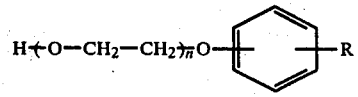

wherein R represents $-C_mH_{2m+1}$ or $-O-C_mH_{2m+1}$, m represents 0 or an integer of 1 to 6, and n represents an integer of 1 to 10.

Polyethylene glycol phenyl ether or the derivatives thereof represented by the above general formula in which n is an integer of 11 or more are not suitable for use in the present invention because they either show high viscosity or solidify at room temperature. Those of the above general formula in which m is an integer of 7 or more are neither suitable for use in this invention because they have strong surface-activating properties and suffer from the same defects as surface-active agents heretofore used.

The polyethylene glycol phenyl ether and the derivatives thereof used in this invention are difficult to use singly as a wetting agent because they have a solubility in water of not more than 2 to 3% at room temperature, the low ability to dissolve water-soluble dyes, and low water-holding properties. Surprisingly, however, when these compounds are used together with other wetting agents, these properties can be improved. For example, the polyethylene glycol phenyl ether or its derivative exhibits the greatest ability to dissolve dyes when used in an amount of about 1 to 2% in combination with another wetting agent. In addition, the resulting ink is free from foamability and has excellent stability with time and a surface tension in the range of 40 to 55 dynes/cm, and therefore gives printed characters having excellent drying properties and reduced blurring.

In the present invention, any dyes which are soluble in water can be used. Examples of suitable water-soluble dyes include C. I. Direct Yellow 8, 12, 26, 28, 44, 50, 86, 98 and 142; C. I. Acid Yellow 7, 19, 23, 38, 44, 61, 110, 141 and 193; C. I. Direct Red 4, 9, 13, 23, 31, 79, 81, 83, 240 and 247; C. I. Acid Red 1, 6, 14, 35, 52, 88, 111, 131, 249 and 274; C. I. Direct Blue 1, 2, 15, 22, 25, 71, 86, 90, 98 and 192; C. I. Acid Blue 7, 40, 62, 78, 83, 92, 112, 126 and 129; C. I. Direct Black 17, 19, 22, 32, 38, 51, 62, 107, 112, 132 and 154; and C. I. Acid Black 1, 2, 24, 31, 52, 58, 60, 107, 109 and 155. These dyes can be used either singly or as a mixture of two or more.

Examples of wetting agents that can be used in this invention include polyhydric alcohols such as ethylene glycol, diethylene glycol, glycerol, triethylene glycol, tetraethylene glycol, polyethylene glycol #200, #300, #400 and #600, and polypropylene glycol; pyrrolidones such as N-vinylpyrrolidone, N-methylpyrrolidone and beta-hydroxyethylpyrrolidone; low-molecular-weight alkyleneimines such as low-molecular-weight polyethyleneimine and low-molecular-weight polypropyleneimine; aminoalcohols such as monoethanolamine, diethanolamine, triethanolamine, N,N-dimethylethanolamine and aminoethylethanolamine; and amides such as formamide and N,N-dimethylformamide.

The ink-jet printing ink of the invention having a preferred composition can be prepared by uniformly dissolving 0.5 to 10 parts by weight of the water-soluble dye, 5 to 30 parts by weight of the wetting agent and 0.1 to 5 parts by weight of the polyethylene glycol phenyl ether and/or its derivative represented by the general formula given hereinabove in 100 parts by weight of water.

If desired, the ink-jet printing ink of this invention may further contain a pH adjuster such as sodium bicarbonate, a metal blocking agent such as EDTA and gluconic acid, a moldproofing agent such as sodium dehydroacetate, 2,4,6-trichlorophenol, dioxine and Sodium Omadine.

The following examples illustrate the present invention more specifically. All parts in these examples are by weight.

EXAMPLE 1

| | |
|---|---|
| Direct Fast Black Conc. (a product of Sumitomo Chemical Co., Ltd.) | 2.5 parts |
| Ethylene glycol | 20 parts |
| Polyethylene glycol phenyl ether (CARPOLE EX-2282, a product of Asahi Denka Kogyo Co., Ltd.) | 2 parts |
| Sodium dehydroacetate | 0.4 part |
| Sodium borate | 0.1 part |
| Purified water | 75 parts |

The above ingredients were charged into an agitating tank and sufficiently mixed with agitation. The mixture was filtered through a 1-micron filter to form ink.

The ink was set in an ink-jet printer, and jetted out for 8 hours. The jetting was suspended, and after standing for one month, the jetting test was again performed. Despite the fact that the ink was allowed to stand in the printer for a long period of time, no nozzle blockage was noted, and the ink could be jetted stably. The printed characters on paper dried within a period of as short as about 5 seconds, and showed little blurring.

COMPARATIVE EXAMPLE 1

| | |
|---|---|
| Direct Fast Black Conc. | 2.5 parts |
| Ethylene glycol | 22 parts |
| Sodium dehydroacetate | 0.4 part |
| Sodium borate | 0.1 part |
| Purified water | 75 parts |

Ink prepared from the above ingredients was tested by the same procedure as in Example 1. On standing for 2 weeks, the jetting direction of the ink was deviated. Microscopic observation showed that there was a deposit around the nozzle orifices.

EXAMPLE 2

| | |
|---|---|
| Aizen Primula 4BH (a product of Hodogaya Chemical Co., Ltd.) | 1.5 parts |
| Triethylene glycol | 20 parts |
| Tetraethylene glycol ethyl phenyl ether | 2 parts |
| Dioxine | 0.5 part |
| Purified water | 77 parts |

The above ingredients were charged into an agitating tank and fully mixed with agitation. The mixture was filtered through a 1-micron filter to form ink. The ink was set in an ink-jet printer, and jetted for 8 hours. Then, the jetting was suspended, and after standing for 2 weeks, the jetting test was again performed. No nozzle blockage was noted, and the ink could be jetted stably. The printed characters on paper dried in 2 to 3 seconds, and showed little blurring.

COMPARATIVE EXAMPLE 2

| | |
|---|---|
| Aizen Primula Red | 1.5 parts |
| Triethylene glycol | 20.5 parts |
| Polyethylene glycol nonyl phenyl ether (Nikkol NP-15, a tradename for a product of Nikko Chemicals Co., Ltd.) | 0.5 part |
| Dioxine | 0.5 part |
| Purified water | 77 parts |

Ink prepared from the above ingredients was tested by the same procedure as in Example 2. On standing for 2 weeks, the nozzles were completely blocked up. The ink had great foamability. The printed characters on paper dried in as short as 1 to 2 seconds, but showed much blurring.

EXAMPLE 3

| | |
|---|---|
| C. I. Direct Black 17 | 2.8 parts |
| Diethylene glycol | 20 parts |
| Triethylene glycol | 10 parts |
| Heptaethylene glycol methoxy phenyl ether | 2 parts |
| Sodium Omadine | 0.2 part |
| Purified water | 65.0 parts |

The above ingredients were charged into an agitating tank, and fully mixed with agitation. The mixture was filtered through a 1-micron filter to form ink. The ink was set in an ink-jet printer, and jetter for 8 hours. Then, the jetting was suspended, and on standing for 2 weeks, the jetting test was again performed. No nozzle blockage was noted, and the ink could be jetted stably. The printed characters on paper dried in about 5 seconds, and showed little blurring.

COMPARATIVE EXAMPLE 3

| | |
|---|---|
| C. I. Direct Black 17 | 2.8 parts |
| Diethylene glycol | 20 parts |
| Triethylene glycol | 9.9 parts |
| Dipolyoxyethylene alkyl ether phosphoric acid (Nikkol DDP-4, a tradename for a product of Nikko Chemicals Co., Ltd.) | 0.1 part |
| Omadine | 0.2 part |
| Purified water | 67 parts |

Ink prepared from the above ingredients was tested by the same procedure as in Example 3. On standing for 2 weeks, the nozzles were completely blocked up, and the ink had some foamability. By heating the ink at 50° C. for 1 month, a large amount of precipitate formed in the ink. The printed characters on paper dried in about 10 seconds.

What is claimed is:

1. Ink for use in an ink-jet printer, said ink comprising a solution in water of a water-soluble dye, a wetting agent and a compound of the following formula

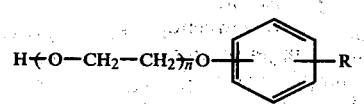

wherein R represents $-C_mH_{2m+1}$ or $-O-C_mH_{2m+1}$, m represents 0 or an integer of 1 to 6, and n represents an integer of 1 to 10.

2. The ink of claim 1 wherein the wetting agent is a polyhydric alcohol, a pyrrolidone, an aminoalcohol or an amide.

3. The ink of claim 1 which comprises a solution in 100 parts by weight of water of 0.5 to 10 parts by weight of the water-soluble dye, 5 to 30 parts by weight of the wetting agent, and 0.1 to 5 parts by weight of the compound of said formula.

4. The ink of claim 3 wherein the wetting agent is a polyhydric alcohol, a pyrrolidone, an amino alcohol or an amide.

5. The ink of claim 1 wherein m is 0.

6. The ink of claim 1 wherein the compound of the formula is tetraethylene glycol ethyl phenyl ether.

7. The ink of claim 1 wherein the compound of the formula is heptaethylene glycol methoxy phenyl ether.

8. The ink of claim 3 wherein m is 0.

9. The ink of claim 3 wherein the compound of the formula is tetraethylene glycol ethyl phenyl ether.

10. The ink of claim 3 wherein the compound of the formula is heptaethylene glycol methoxy phenyl ether.

11. The ink of claim 4 wherein the m is 0.

12. The ink of claim 4 wherein the compound of the formula is tetraethylene glycol ethyl phenyl ether.

13. The ink of claim 4 wherein the compound of the formula is heptaethylene glycol methoxy phenyl ether.

* * * * *